(12) United States Patent
Horiuchi et al.

(10) Patent No.: US 11,099,286 B2
(45) Date of Patent: Aug. 24, 2021

(54) RADIATION DETECTION DEVICE

(71) Applicant: FUJIFILM Corporation, Tokyo (JP)

(72) Inventors: Hisatsugu Horiuchi, Kanagawa (JP);
Masateru Tateishi, Kanagawa (JP);
Shinsuke Noguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/878,152

(22) Filed: May 19, 2020

(65) Prior Publication Data

US 2020/0278462 A1    Sep. 3, 2020

Related U.S. Application Data

(63) Continuation of application No. 16/201,451, filed on Nov. 27, 2018, now Pat. No. 10,690,789.

(30) Foreign Application Priority Data

Dec. 22, 2017   (JP) .............................. JP2017-246639

(51) Int. Cl.
*G01T 7/00*     (2006.01)
*G01T 1/208*    (2006.01)
*G01T 1/20*     (2006.01)
*G01T 1/24*     (2006.01)

(52) U.S. Cl.
CPC .............. *G01T 7/005* (2013.01); *G01T 1/208* (2013.01); *G01T 1/2018* (2013.01); *G01T 1/244* (2013.01)

(58) Field of Classification Search
CPC ......... G01T 7/005; G01T 1/244; G01T 1/208; G01T 1/2018; G01T 1/2012
See application file for complete search history.

(56) References Cited

U.S. PATENT DOCUMENTS 5,594,774 A * 1/1997 Schmidt .................. A61F 17/00
                                                          378/167
8,256,957 B1   9/2012 Barnes et al.
9,322,934 B2   4/2016 Ogura et al.
(Continued)

FOREIGN PATENT DOCUMENTS

JP        2014-25847 A    2/2014

OTHER PUBLICATIONS

U.S. Office Action for U.S. Appl. No. 16/201,451, dated Feb. 20, 2020 (Notice of Allowance).

*Primary Examiner* — Marcus H Taningco
(74) *Attorney, Agent, or Firm* — Birch, Stewart, Kolasch & Birch LLP (57) ABSTRACT

A radiation detection device includes: a radiation detection panel; a supporting member having a first surface and a second surface being opposite to the first surface, wherein the radiation detection panel is provided at a side of the first surface; an electronic component that is provided on the second surface of the supporting member and drives the radiation detection panel or processes an electric signal output from the radiation detection panel; and a housing that accommodates the radiation detection panel, the supporting member, and the electronic component, a bottom of the housing which faces the second surface comprises a flat portion and a slope portion that is adjacent to the flat portion and becomes closer to the second surface as becoming further away from the flat portion, and the electronic component is provided at a position as defined herein.

20 Claims, 9 Drawing Sheets

(56) References Cited

U.S. PATENT DOCUMENTS

| | | |
|---|---|---|
| 9,968,315 B2 | 5/2018 | Ogura et al. |
| 2010/0148081 A1* | 6/2010 | Yoshimi ............... A61B 6/4233 250/370.08 |
| 2011/0248173 A1 | 10/2011 | Ogura |
| 2012/0314354 A1 | 12/2012 | Rayner |
| 2014/0027637 A1 | 1/2014 | Watano |
| 2015/0253441 A1 | 9/2015 | Horiuchi et al. |
| 2016/0081649 A1 | 3/2016 | Enomoto et al. |
| 2017/0294247 A1 | 10/2017 | Maclaughlin |

* cited by examiner

RADIATION DETECTION DEVICE

CROSS-REFERENCE TO RELATED APPLICATIONS

This application is a Continuation of copending application Ser. No. 16/201,451, filed on Nov. 27, 2018, which claims priority under 35 U.S.C. § 119(a) to Application No. 2017-246639, filed in Japan on Dec. 22, 2017, all of which are hereby expressly incorporated by reference into the present application.

BACKGROUND OF THE INVENTION

1. Field of the Invention

The present invention relates to a radiation detection device.

2. Description of the Related Art

A so-called flat panel detector (FPD) is used to acquire a radiographic image of an object. The FPD comprises, for example, a scintillator that emits fluorescence corresponding to the amount of incident radiation and a detection substrate on which pixels detecting the fluorescence emitted from the scintillator are two-dimensionally arranged. Radiation transmitted through the object is incident on the scintillator and each pixel converts the fluorescence generated from the scintillator into an electric signal. Radiographic image data of the object is generated on the basis of the electric signal output from each pixel. A so-called electronic cassette in which an FPD is accommodated in a housing and which is portable has been known as the radiation detection device comprising the FPD (for example, see JP2014-025847A).

A radiography apparatus disclosed in JP2014-025847A comprises a radiation detection panel which is an FPD, a signal processing substrate which is a wiring substrate having various circuits mounted thereon, a supporting member on which the radiation detection panel and the signal processing substrate are provided, and a housing which accommodating the radiation detection panel, the signal processing substrate, and the supporting member. The radiation detection panel is provided on an irradiation surface of the supporting member and the signal processing substrate is provided on a non-irradiation surface of the supporting member. The radiation detection panel and the signal processing substrate are connected to each other by a flexible substrate that is bent so as to pass between a side surface of the supporting member and a side portion of the housing. An electronic component that performs signal processing is mounted on the flexible substrate. The electronic component is provided at the edge of the non-irradiation surface of the supporting member.

SUMMARY OF THE INVENTION

A portable electronic cassette can be placed at various locations and then used. However, in a case in which the portable electronic cassette falls down, an impact is likely to be applied to the portable electronic cassette. In the radiography apparatus disclosed in JP2014-025847A, the entire bottom of the housing is flat and the impact applied in a case in which the radiography apparatus falls down is mainly applied to the edge of the bottom of the housing. The electronic component is provided so as to face the edge of the bottom of the housing. The thickness of the electronic cassette is typically about 15 mm. In a case in which there is a gap between the electronic component and the bottom of the housing, the gap is about several millimeters. Therefore, in a case in which the bottom of the housing is deformed by the impact applied to the edge of the bottom, the bottom of the housing comes into contact with the electronic component and the impact is transmitted to the electronic component. As a result, there is a concern that the electronic component will be damaged.

The invention has been made in view of the above-mentioned problems and an object of the invention is to provide a radiation detection device that can protect an electronic component from an impact applied in a case in which the radiation detection device falls down.

According to an aspect of the invention, there is provided a radiation detection device comprising: a radiation detection panel; a supporting member having a first surface on which the radiation detection panel is provided; an electronic component that is provided on a second surface opposite the first surface of the supporting member and drives the radiation detection panel or processes an electric signal output from the radiation detection panel; and a housing that accommodates the radiation detection panel, the supporting member, and the electronic component. A bottom of the housing which faces the second surface includes a flat portion and a slope portion that is adjacent to the flat portion and becomes closer to the second surface as becoming further away from the flat portion. The electronic component is provided at a position where at least a center of gravity of the electronic component overlaps the slope portion.

According to the invention, it is possible to provide a radiation detection device that can protect an electronic component from an impact applied in a case in which the radiation detection device falls down.

DESCRIPTION OF THE PREFERRED EMBODIMENTS

Figure 1:
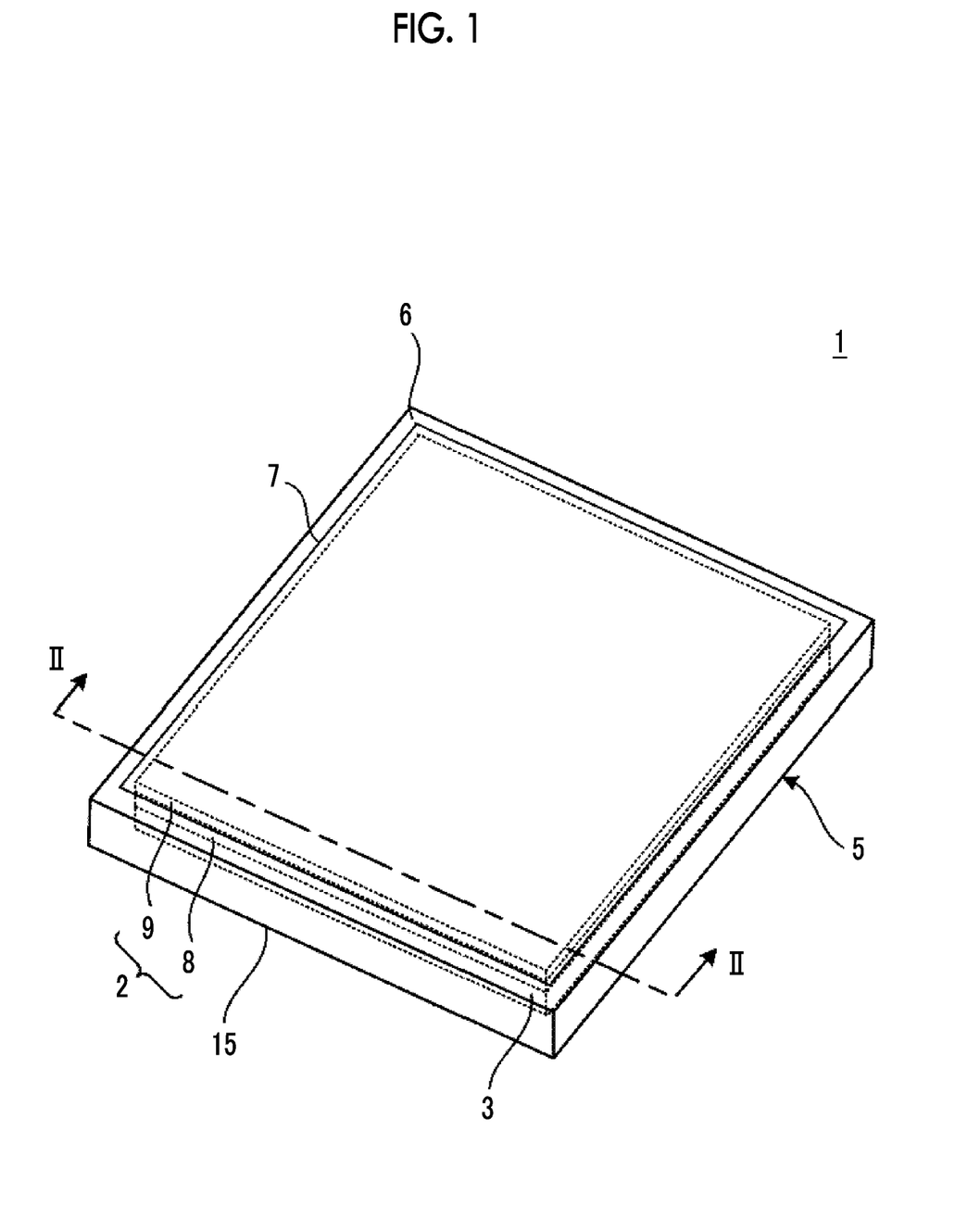
FIG. 1 is a perspective view illustrating an example of a radiation detection device for describing an embodiment of the invention.
Figure 2:
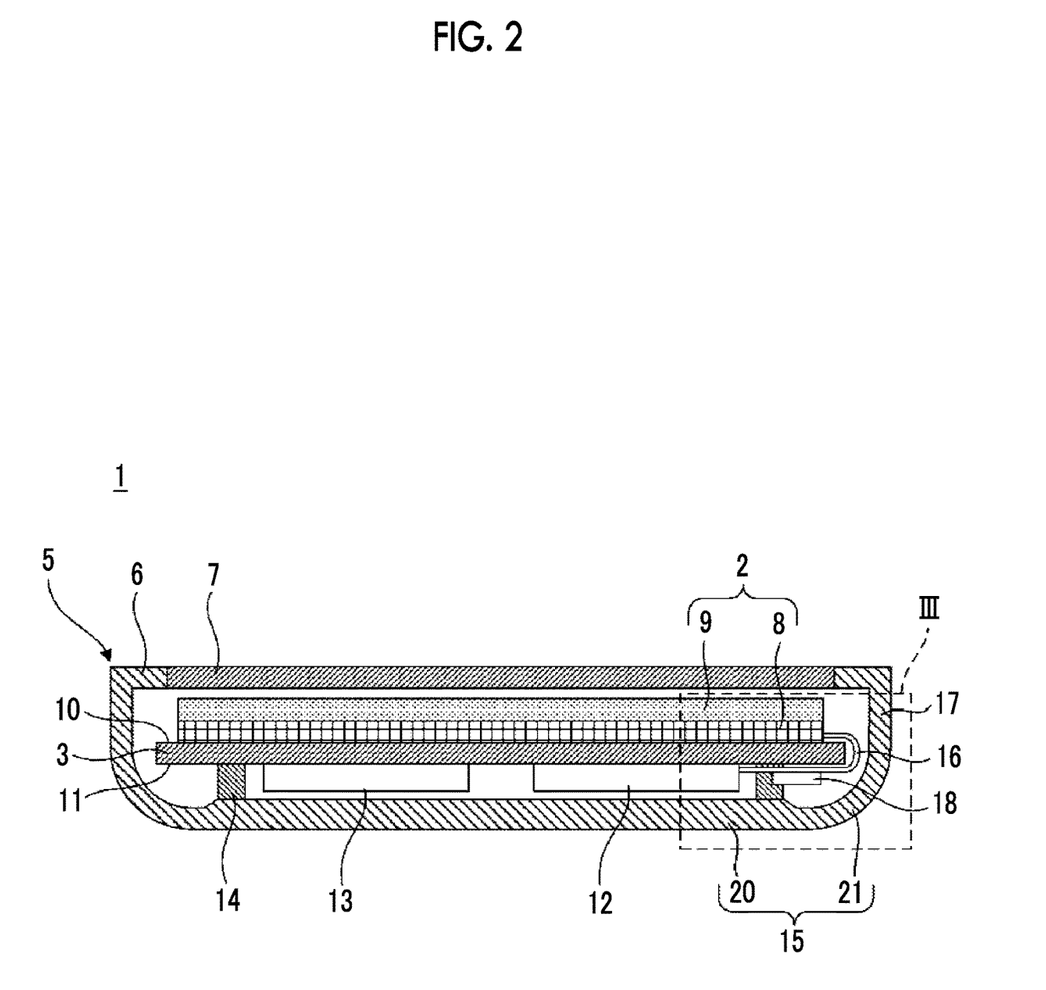
FIG. 2 is a cross-sectional view illustrating the radiation detection device taken along the line II-II of FIG. 1.

FIGS. 1 and 2 illustrate an example of a radiation detection device for describing an embodiment of the invention.

A radiation detection device 1 illustrated in FIGS. 1 and 2 is a so-called electronic cassette and comprises a radiation detection panel 2 that detects radiation, such as X-rays, a supporting member 3, and a housing 5 that accommodates the radiation detection panel 2 and the supporting member 3.

The housing 5 is formed in a rectangular parallelepiped shape and typically has a size based on the International Organization for Standardization (ISO) 4090:2001. It is preferable that the housing 5 is made of a material which can reduce weight and increase load resistance. Examples of the material include a magnesium alloy, an aluminum alloy, a fiber reinforced resin, a cellulose nanofiber (CNF) reinforced resin, and a resin that satisfy a specific gravity of 3.0 or less and a Young's modulus of 1.8 GPa or more. A rectangular opening is formed in a top plate 6 of the housing 5. A transmission plate 7 that transmits radiation is attached to the opening.

The radiation detection panel 2 includes a scintillator 8 and a detection substrate 9 and is provided behind the transmission plate 7 in the housing 5. The scintillator 8 has a phosphor, such as CsI:Tl (thallium-activated cesium iodide) or GOS ($Gd_2O_2S$:Tb, terbium-activated gadolinium oxysulfide), and emits fluorescence corresponding to the amount of incident radiation. The detection substrate 9 includes a plurality of pixels that are two-dimensionally arranged, detects fluorescence generated by the scintillator 8 with the pixels, and converts the detected fluorescence into an electric signal.

In this example, the scintillator 8 and the detection substrate 9 are stacked in the order of the scintillator 8 and the detection substrate 9 from the transmission plate 7 of the housing 5. However, the scintillator 8 and the detection substrate 9 may be stacked in the order of the detection substrate 9 and the scintillator 8 from the transmission plate 7. In addition, a direct-conversion-type radiation detection panel may be used in which a photoconductive film of each pixel of the detection substrate 9 that generates signal charge is made of, for example, amorphous selenium and which directly converts radiation into signal charge.

The supporting member 3 is a plate-shaped member and is formed in a rectangular shape. In the specification, the rectangular shape is not limited to a quadrangle with right-angled corners and includes a quadrangle with chamfered corners or a quadrangle with rounded corners. The supporting member 3 has a first surface 10 that faces the top plate 6 of the housing 5 and a second surface 11 that is opposite to the first surface 10. The radiation detection panel 2 is provided on the first surface 10 of the supporting member 3. In addition, the radiation detection panel 2 may be attached to the supporting member 3 or may be attached to the top plate 6 and the transmission plate 7 of the housing 5. It is preferable that the supporting member 3 is made of a material which can reduce weight and increase load resistance. Examples of the material include a magnesium alloy, an aluminum alloy, a fiber reinforced resin, a cellulose nanofiber (CNF) reinforced resin, and a resin that satisfy a specific gravity of 3.0 or less and a Young's modulus of 1.8 GPa or more.

A circuit substrate 12 and a power supply unit 13 are accommodated in the housing 5. For example, a driving control circuit that controls the driving of the detection substrate 9, a signal processing circuit that processes the electric signal output from the detection substrate 9, a communication circuit for communication with the outside, and a power circuit are formed on the circuit substrate 12. The power supply unit 13 supplies power to the detection substrate 9 and the circuit substrate 12. The power supply unit 13 is a rechargeable battery, such as a lithium-ion secondary battery, or a capacitor, such as an electric double layer capacitor or a lithium-ion capacitor. The circuit substrate 12 and the power supply unit 13 are bonded to the second surface 11 of the supporting member 3.

The circuit substrate 12 is schematically illustrated as a single element in FIG. 2. However, the circuit substrate 12 may be divided into a plurality of circuit substrates and the plurality of circuit substrates may be dispersed on the second surface 11 of the supporting member 3. The power supply unit 13 is schematically illustrated as a single element in FIG. 2. However, the power supply unit 13 may be divided into a plurality of power supply units and the plurality of power supply units may be dispersed on the second surface 11 of the supporting member 3.

A plurality of spacers 14 are provided on the second surface 11 of the supporting member 3. The plurality of spacers 14 protrude from the circuit substrate 12 and the power supply unit 13 and come into contact with a bottom 15 of the housing 5 which faces the second surface 11. The supporting member 3 is supported by the plurality of spacers 14. There is a gap between the bottom 15 of the housing 5 and the circuit substrate 12 and the power supply unit 13.

The detection substrate 9 of the radiation detection panel 2 provided above the first surface 10 of the supporting member 3 and the circuit substrate 12 provided on the second surface 11 of the supporting member 3 are connected to each other by a flexible substrate 16. The flexible substrate 16 is bent so as to pass between the supporting member 3 and a side portion 17 of the housing 5. One or more electronic components 18 are mounted on the flexible substrate 16. The electronic component 18 is provided at the edge of the second surface 11 of the supporting member 3.

The electronic component 18 is, for example, a reading integrated circuit (IC) that reads the signal charge (analog signal) output from each pixel of the detection substrate 9. The reading IC forms a portion of the signal processing circuit of the circuit substrate 12. In addition, the electronic component 18 may be a driving IC that controls a signal charge accumulation operation, an output operation, and a reset operation in each pixel of the detection substrate 9. The driving IC forms a portion of the driving control circuit of the circuit substrate 12.

Figure 3:
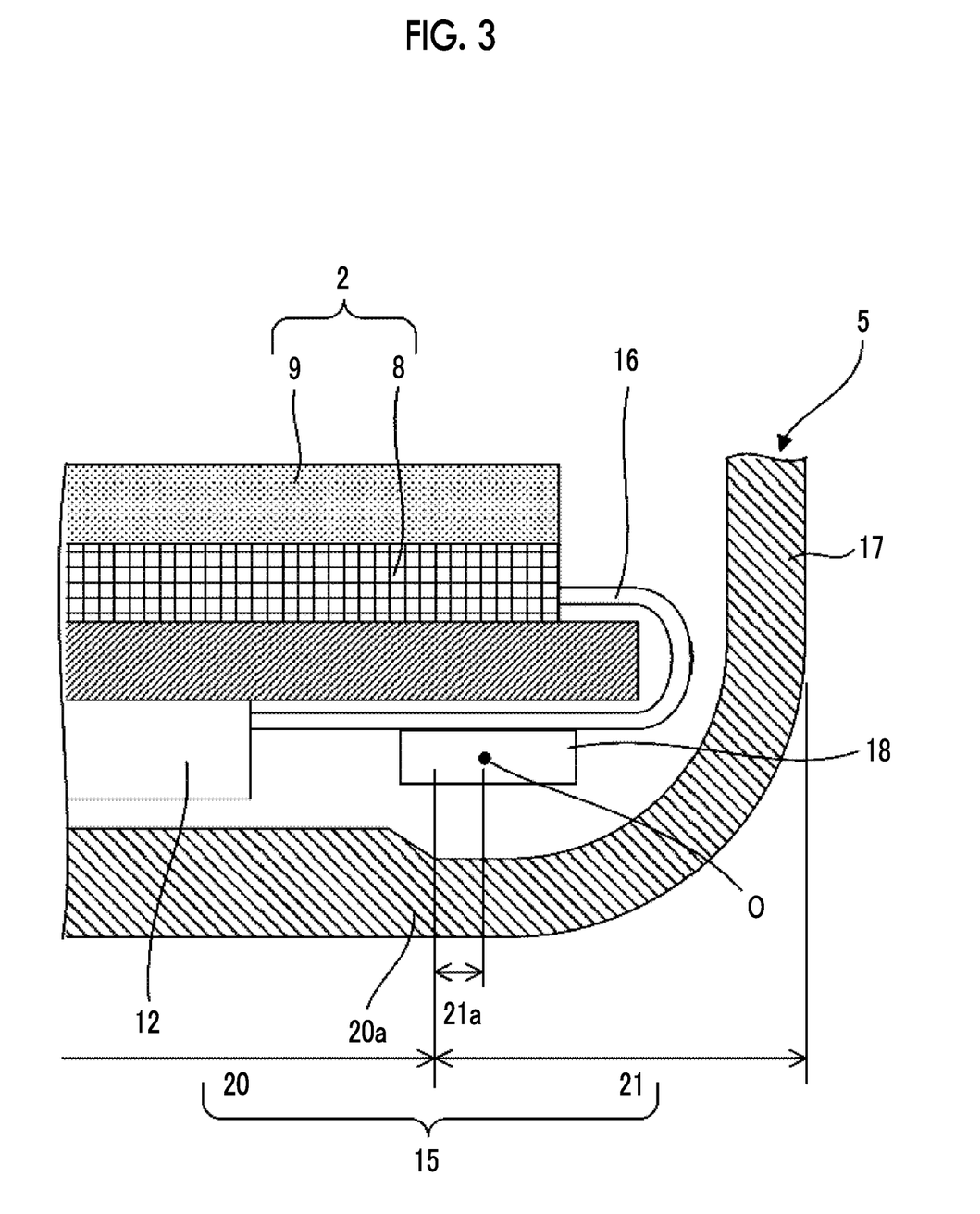
FIG. 3 is an enlarged view illustrating a portion surrounded by a dashed frame III illustrated in FIG. 2.

FIG. 3 is an enlarged view illustrating the surroundings of the electronic component 18.

The bottom 15 of the housing 5 which faces the second surface 11 of the supporting member 3 includes a flat portion 20 and a slope portion 21. The slope portion 21 is adjacent to the flat portion 20 and forms the edge of the bottom 15 of the housing 5. The slope portion 21 becomes closer to the second surface 11 as it becomes further away from the flat portion 20. The electronic component 18 provided at the edge of the second surface 11 of the supporting member 3 is disposed at a position where at least the center of gravity O of the electronic component 18 overlaps the slope portion 21. In this example, the electronic component 18 does not come into contact with the flat portion 20 and the slope portion 21.

Figure 4:
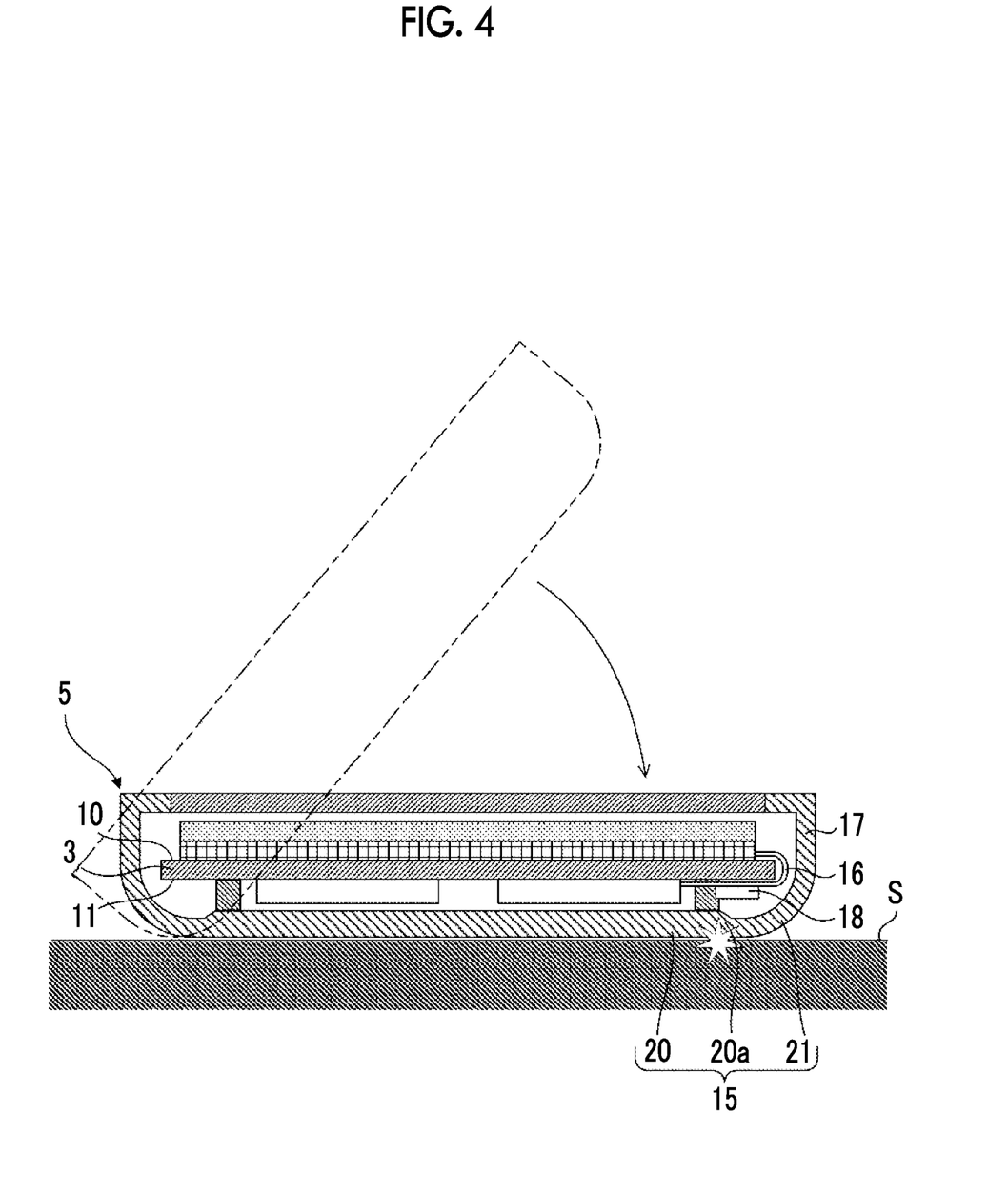
FIG. 4 is a diagram schematically illustrating the function of a slope portion of the bottom of a housing illustrated in FIG. 2.

FIG. 4 schematically illustrates the function of the slope portion of the bottom of the housing 5.

FIG. 4 illustrates a state in which the radiation detection device 1 falls down and the bottom 15 of the housing 5 comes into contact with an installation surface S. The slope portion 21 becomes closer to the second surface 11 of the supporting member 3 as it becomes further away from the flat portion 20. The flat portion 20 comes into contact with the installation surface S and the slope portion 21 becomes further away from the installation surface S as it becomes further away from the flat portion 20. In a case in which the radiation detection device 1 falls down and the bottom 15 comes into contact with the installation surface S, an impact is applied to a boundary portion 20a of the flat portion 20 with the slope portion 21.

Since the center of gravity O of the electronic component 18 is disposed at the position that overlaps the slope portion 21, the impact applied to the boundary portion 20a of the flat portion 20 is prevented from being directly transmitted to the electronic component 18. The impact applied to the boundary portion 20a of the flat portion 20 is dispersed to the flat portion 20 and the slope portion 21. Even in a case in which the impact dispersed to the slope portion 21 is transmitted to the electronic component 18, the impact transmitted to the electronic component 18 is a portion of the impact applied to the boundary portion 20a of the flat portion 20 and is reduced. Therefore, it is possible to prevent the damage of the electronic component 18 and to prevent noise from being superimposed on the electronic component 18. The amount of noise superimposed in analog signal processing is significantly more than the amount of noise superimposed in digital signal processing. This configuration is particularly useful in a case in which the electronic component 18 processes analog signals. In addition, the analog signal processing includes the conversion of an analog signal into a digital signal.

Preferably, as illustrated in FIG. 3, the slope portion 21 includes a portion that is provided between the boundary between the flat portion 20 and the slope portion 21 and a position that overlaps the center of gravity O of the electronic component 18 and is thinner than the flat portion 20. With this configuration, a relatively large impact can be dispersed to the flat portion 20 and a relatively small impact can be dispersed to the slope portion 21. Therefore, it is possible to further prevent the damage of the electronic component 18. In the example illustrated in FIG. 3, the entire intermediate portion 21a between the boundary between the flat portion 20 and the slope portion 21 and the position that overlaps the center of gravity O of the electronic component 18 in the slope portion 21 is thinner than the flat portion 20. However, at least a portion of the intermediate portion 21a may be thinner than the flat portion 20. The thickness of a portion which is located outside the position that overlaps the center of gravity O of the electronic component 18 (on the side opposite to the intermediate portion 21a) in the slope portion 21 is not particularly limited. In addition, the slope portion 21 may be softer than the flat portion 20, that is, the slope portion 21 and the flat portion 20 may be made of different materials and the Young's modulus of the material forming the slope portion 21 may be relatively small. In this case, a relatively large impact can be dispersed to the flat portion 20 and a relatively small impact can be dispersed to the slope portion 21. Therefore, it is possible to further prevent the damage of the electronic component 18.

Figure 5:
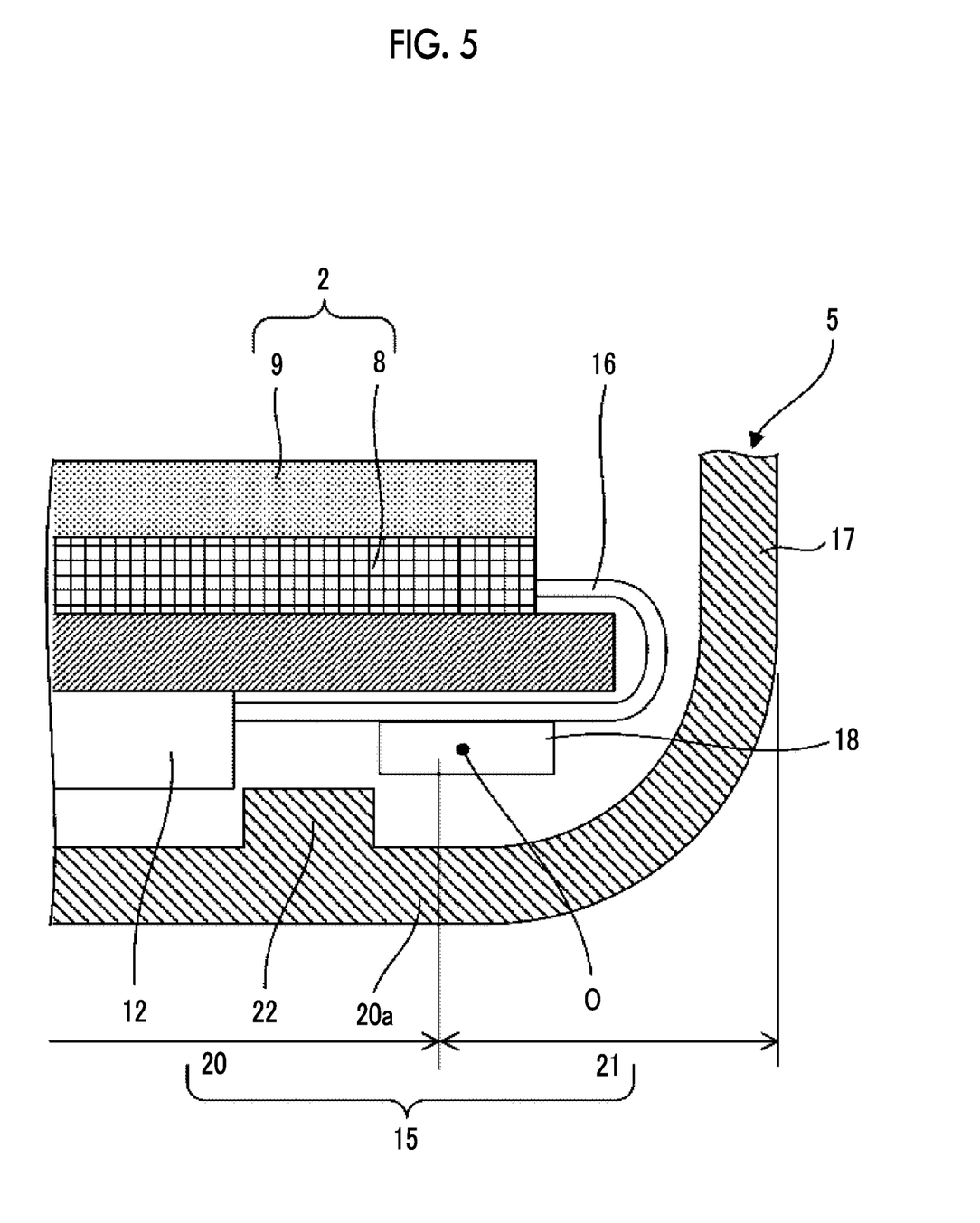
FIG. 5 is a cross-sectional view illustrating a main portion of another example of the radiation detection device for describing the embodiment of the invention.

In an example illustrated in FIG. 5, the flat portion 20 includes a rib 22 that protrudes toward the second surface 11 of the supporting member 3. The rib 22 is provided so as to be opposite to the center of gravity O of the electronic component 18, with the boundary portion 20a of the flat portion 20 interposed therebetween. The rib 22 causes the thickness of the flat portion 20 to be large in the vicinity of the boundary portion 20a. With this configuration, a relatively large impact can be dispersed to the flat portion 20 and a relatively small impact can be dispersed to the slope portion 21. Therefore, it is possible to further prevent the damage of the electronic component 18. In addition, the weight of the housing 5 can be less than that in a case in which the thickness of the entire flat portion 20 is large and it is possible to widen the arrangement space of the circuit substrate 12 and the power supply unit 13 (see FIG. 1) provided between the flat portion 20 and the second surface 11 of the supporting member 3.

Figure 6:
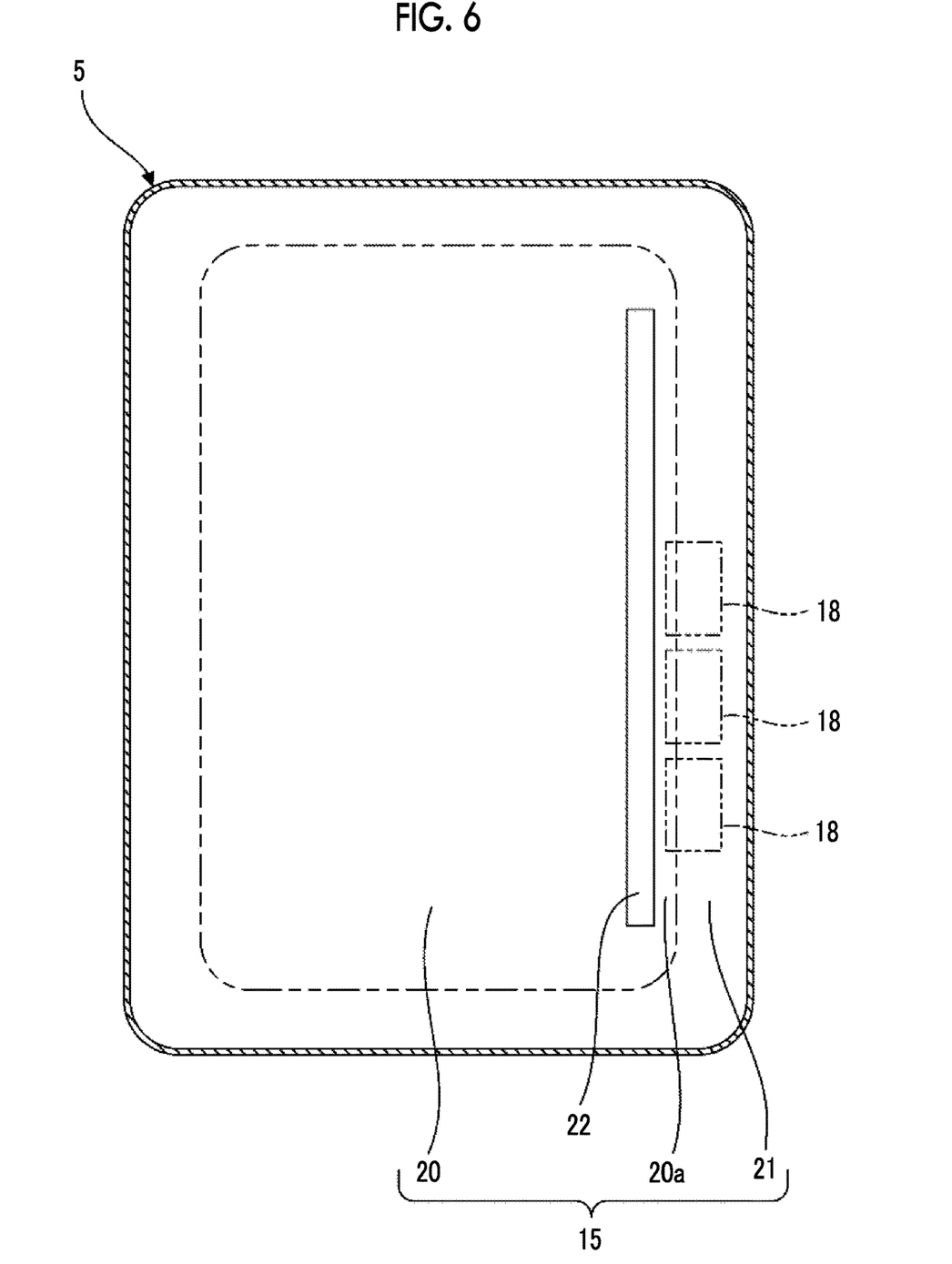
FIG. 6 is a diagram schematically illustrating a modification example of the radiation detection device illustrated in FIG. 5.
Figure 7:
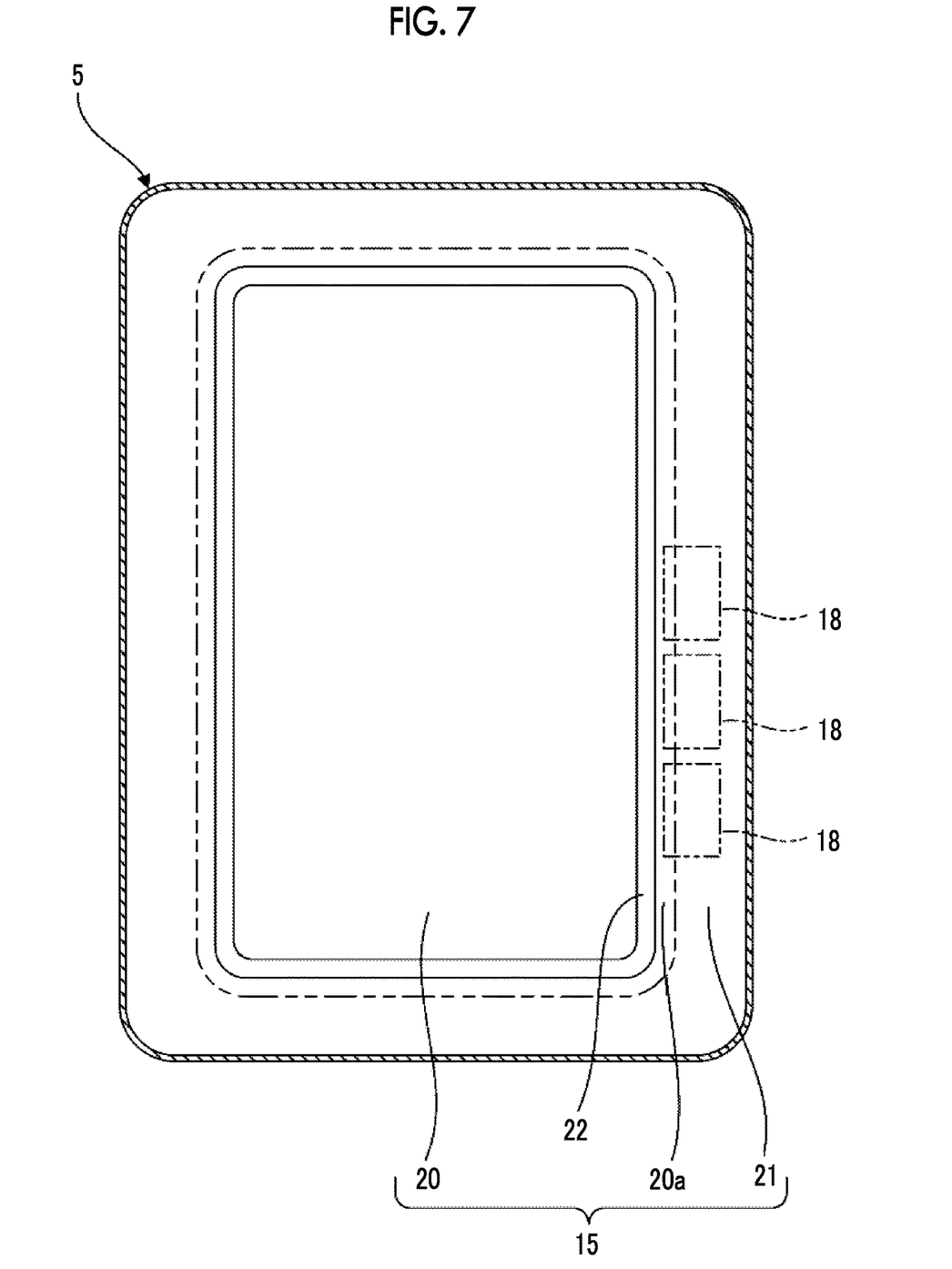
FIG. 7 is a diagram schematically illustrating another modification example of the radiation detection device illustrated in FIG. 5.

It is preferable that the rib 22 extends along the boundary portion 20a of the flat portion 20 as illustrated in FIG. 6. It is more preferable that the rib 22 is formed in a ring shape around the outer periphery of the flat portion 20 including the boundary portion 20a as illustrated in FIG. 7. The impact dispersed to the flat portion 20 is transmitted along the rib 22, which makes it possible to reduce the impact transmitted to the central portion of the flat portion 20. Therefore, it is possible to avoid or prevent the transmission of an impact to the circuit substrate 12 and the power supply unit 13 (see FIG. 1) provided at the position that overlaps the central portion of the flat portion 20.

Figure 8:
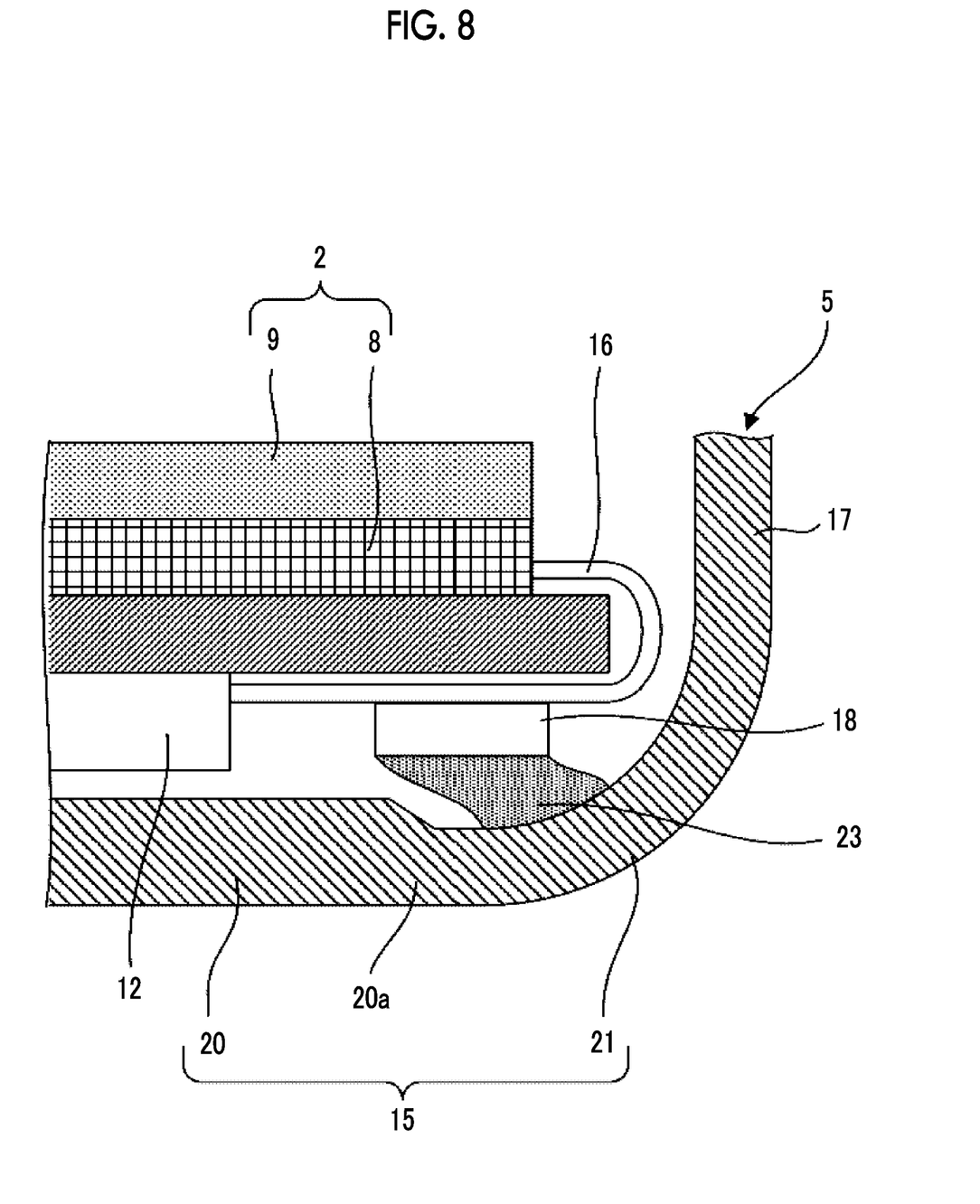
FIG. 8 is a cross-sectional view illustrating a main portion of still another example of the radiation detection device for describing the embodiment of the invention.

In the above description, the electronic component 18 does not come into contact with the flat portion 20 and the slope portion 21. However, as illustrated in FIG. 8, the electronic component 18 may come into contact with the slope portion 21 through a thermal conductor 23 with viscosity. In a case in which the electronic component 18 comes into contact with the slope portion 21, the impact dispersed to the slope portion 21 can be transmitted to the electronic component 18. However, the impact transmitted to the electronic component 18 is absorbed or attenuated by the viscosity of the thermal conductor 23. Therefore, it is possible to prevent the damage of the electronic component 18. Heat generated from the electronic component 18 is transmitted to the slope portion 21 through the thermal conductor 23 and is effectively dissipated through the housing 5 including the slope portion 21. Therefore, it is possible to prevent the erroneous operation and damage of the electronic component 18 caused by heat. The thermal conductor 23 with viscosity is, for example, gel in which metal particles, such as aluminum, copper, and silver particles, or metal oxide particles, such as alumina and magnesium oxide particles, are dispersed.

Figure 9:
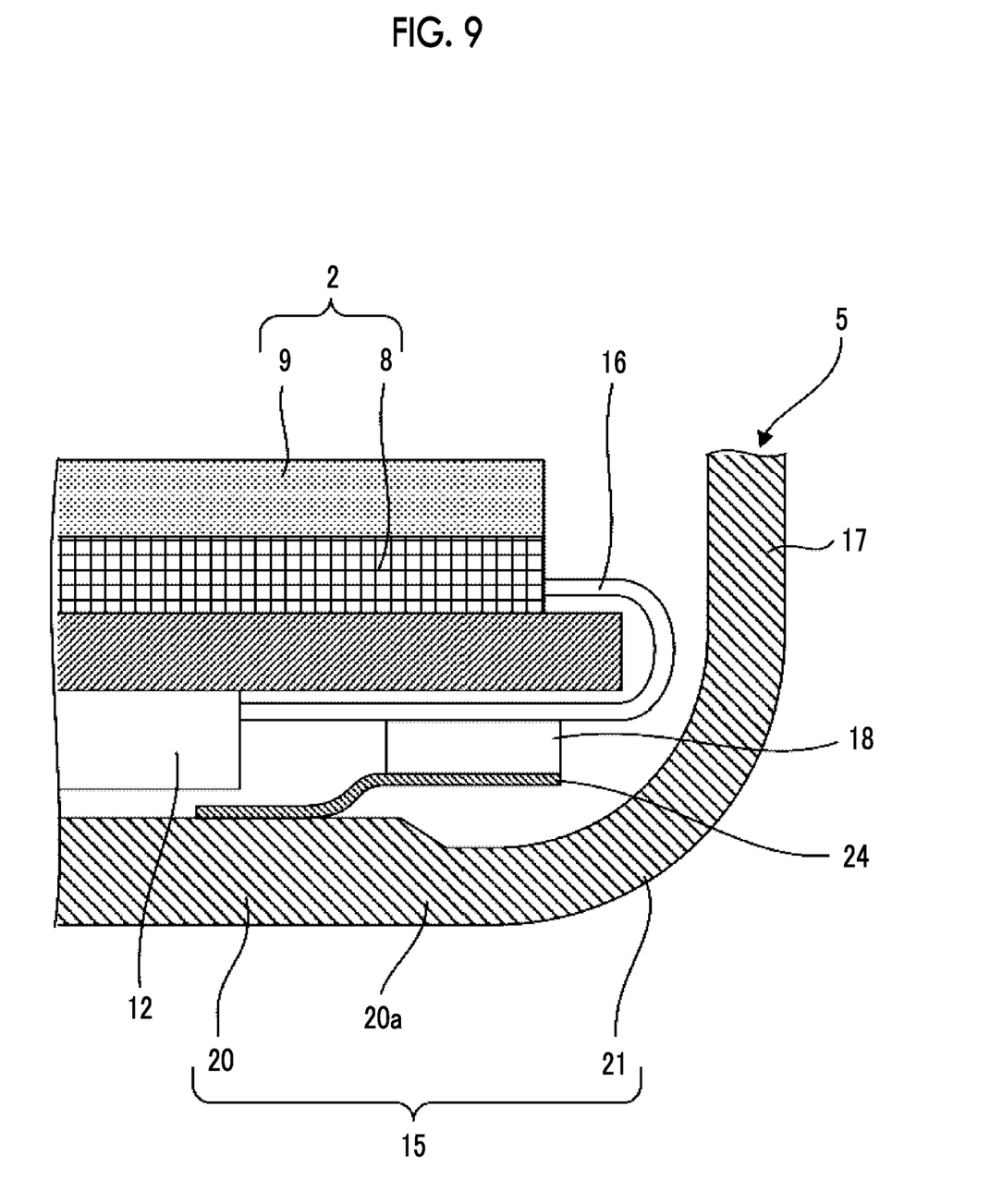
FIG. 9 is a cross-sectional view illustrating a main portion of yet another example of the radiation detection device for describing the embodiment of the invention.

In addition, as illustrated in FIG. 9, the electronic component 18 may be connected to the flat portion 20 through a flexible thermal conductor 24. In a case in which the electronic component 18 is connected to the flat portion 20, the impact dispersed to the flat portion 20 can be transmitted to the electronic component 18. However, the impact transmitted to the electronic component 18 is absorbed or attenuated by the warpage of the thermal conductor 24. Therefore, it is possible to prevent the damage of the electronic component 18. Heat generated from the electronic component 18 is transmitted to the flat portion 20 through the thermal conductor 24 and is effectively dissipated through the housing 5 including the flat portion 20. Therefore, it is possible to prevent the erroneous operation and damage of the electronic component 18 caused by heat. The flexible thermal conductor 24 is a metal foil tape such as an aluminum, copper, or silver foil tape.

The reading IC which is an example of the electronic component 18, for example, includes an integration amplifier for amplifying the signal charge output from each pixel of the detection substrate 9 and generates a relatively large amount of heat. The configuration illustrated in FIG. 8 which dissipates heat using the thermal conductor 23 with viscosity or the configuration illustrated in FIG. 9 which dissipates heat using the flexible thermal conductor 24 is particularly useful in a case in which the electronic component 18 is a reading IC.

As described above, a radiation detection device disclosed in the specification comprises: a radiation detection panel; a supporting member having a first surface on which the radiation detection panel is provided; an electronic component that is provided on a second surface opposite the first surface of the supporting member and drives the radiation detection panel or processes an electric signal output from the radiation detection panel; and a housing that accommodates the radiation detection panel, the supporting member, and the electronic component. A bottom of the housing which faces the second surface includes a flat portion and a slope portion that is adjacent to the flat portion and becomes closer to the second surface as becoming further away from the flat portion. The electronic component is provided at a position where at least a center of gravity of the electronic component overlaps the slope portion.

In the radiation detection device disclosed in the specification, the slope portion includes a portion that is provided between a boundary between the flat portion and the slope portion and a position that overlaps the center of gravity of the electronic component and is thinner than the flat portion.

In the radiation detection device disclosed in the specification, the flat portion includes a rib that protrudes toward the second surface. The rib is provided so as to be opposite to the center of gravity of the electronic component with the boundary between the flat portion and the slope portion interposed therebetween.

In the radiation detection device disclosed in the specification, the rib extends along the boundary between the flat portion and the slope portion.

In the radiation detection device disclosed in the specification, the rib is formed in a ring shape around an outer periphery of the flat portion.

In the radiation detection device disclosed in the specification, the slope portion is softer than the flat portion.

In the radiation detection device disclosed in the specification, the electronic component does not come into contact with the bottom.

In the radiation detection device disclosed in the specification, the electronic component comes into contact with the slope portion through a thermal conductor with viscosity.

In the radiation detection device disclosed in the specification, the electronic component is connected to the flat portion through a flexible thermal conductor.

In the radiation detection device disclosed in the specification, the electronic component processes the electric signal output from the radiation detection panel.

In addition, the electronic component processes an analog signal.

EXPLANATION OF REFERENCES

1: radiation detection device
2: radiation detection panel
3: supporting member
5: housing
6: top plate of housing
7: transmission plate
8: scintillator
9: detection substrate
10: first surface of supporting member
11: second surface of supporting member
12: circuit substrate
13: power supply unit
14: spacer
15: bottom of housing
16: flexible substrate
17: side portion of housing
18: electronic component
20: flat portion
20a: boundary portion
21: slope portion
21a: intermediate portion
22: rib
23: thermal conductor
24: thermal conductor
O: center of gravity
S: installation surface

What is claimed is:

1. A radiation detection device comprising:
a radiation detection panel;
a supporting member having a first surface and a second surface being opposite to the first surface, wherein the radiation detection panel is provided at a side of the first surface;
an electronic component that is provided on the second surface of the supporting member and drives the radiation detection panel or processes an electric signal output from the radiation detection panel; and
a housing that accommodates the radiation detection panel, the supporting member, and the electronic component,
wherein a bottom of the housing which faces the second surface comprises a flat portion and a slope portion that is adjacent to the flat portion and becomes closer to the second surface as becoming further away from the flat portion,
the electronic component does not contact with the flat portion, and
the electronic component contacts with the slope portion through a thermal conductor having a viscosity.

2. The radiation detection device according to claim 1, wherein the slope portion comprises a portion that is provided between a boundary between the flat portion and the slope portion and a part of the slope portion that overlaps a center of gravity of the electronic component when viewed in a direction perpendicular to the second surface and is thinner than the flat portion.

3. The radiation detection device according to claim 2, wherein the slope portion is softer than the flat portion.

4. The radiation detection device according to claim 2, wherein the electronic component is provided at a position where at least a part of the electronic component overlaps the slope portion when viewed in the direction perpendicular to the second surface.

5. The radiation detection device according to claim 2, which further comprises a power supply unit for supplying an electronic power to the radiation detection panel so that the power supply unit is accommodated in the housing.

6. The radiation detection device according to claim 2, wherein the thermal conductor is a gel in which metal particles or metal oxide particles are dispersed.

7. The radiation detection device according to claim 6, wherein the metal particles are aluminum particles, copper particles or silver particles, and the metal oxide particles are alumina particles or magnesium oxide particles.

8. The radiation detection device according to claim 1, wherein the flat portion comprises a rib that protrudes toward the second surface, and the rib is provided so as to be opposite to a center of gravity of the electronic component with the boundary between the flat portion and the slope portion interposed therebetween.

9. The radiation detection device according to claim 8, wherein the rib extends along the boundary between the flat portion and the slope portion.

10. The radiation detection device according to claim 9, wherein the rib is formed in a ring shape around an outer periphery of the flat portion.

11. The radiation detection device according to claim 10, wherein the electronic component is provided at a position where at least a part of the electronic component overlaps the slope portion when viewed in a direction perpendicular to the second surface.

12. The radiation detection device according to claim 9, wherein the electronic component is provided at a position where at least a part of the electronic component overlaps the slope portion when viewed in a direction perpendicular to the second surface.

13. The radiation detection device according to claim 8, wherein the electronic component is provided at a position where at least a part of the electronic component overlaps the slope portion when viewed in a direction perpendicular to the second surface.

14. The radiation detection device according to claim 8, which further comprises a power supply unit for supplying an electronic power to the radiation detection panel so that the power supply unit is accommodated in the housing.

15. The radiation detection device according to claim 1, wherein the slope portion is softer than the flat portion.

16. The radiation detection device according to claim 15, wherein the electronic component is provided at a position where at least a part of the electronic component overlaps the slope portion when viewed in a direction perpendicular to the second surface.

17. The radiation detection device according to claim 1, wherein the electronic component is provided at a position where at least a part of the electronic component overlaps the slope portion when viewed in a direction perpendicular to the second surface.

18. The radiation detection device according to claim 1, which further comprises a power supply unit for supplying an electronic power to the radiation detection panel so that the power supply unit is accommodated in the housing.

19. The radiation detection device according to claim 1, wherein the thermal conductor is a gel in which metal particles or metal oxide particles are dispersed.

20. The radiation detection device according to claim 19, wherein the metal particles are aluminum particles, copper particles or silver particles, and the metal oxide particles are alumina particles or magnesium oxide particles.

* * * * *